(12) United States Patent
Collins

(10) Patent No.: US 8,389,093 B2
(45) Date of Patent: Mar. 5, 2013

(54) SYSTEMS AND METHODS FOR PRODUCING A TILEWAVE FABRIC

(76) Inventor: Jason Harold Collins, Franklin, TN (US)

( * ) Notice: Subject to any disclaimer, the term of this patent is extended or adjusted under 35 U.S.C. 154(b) by 307 days.

(21) Appl. No.: 12/860,687

(22) Filed: Aug. 20, 2010

(65) Prior Publication Data

US 2012/0045605 A1  Feb. 23, 2012

(51) Int. Cl.
  *B32B 3/16* (2006.01)
(52) U.S. Cl. .................... 428/52; 29/525.01; 29/525.08; 2/244
(58) Field of Classification Search .................... 428/52; 112/404, 429; 2/244; 29/428, 525.01, 525.08
  See application file for complete search history.

(56) References Cited

U.S. PATENT DOCUMENTS 5,587,213 A * 12/1996 Ruschmann .................... 428/12

* cited by examiner

*Primary Examiner* — Alexander Thomas
(74) *Attorney, Agent, or Firm* — DLC Patents, PLLC; Dustin L. Call

(57) ABSTRACT

One example embodiment includes a tilewave material. The tilewave material includes a fiber and a first tile, where the first tile includes a first surface and a second surface. The tilewave material also includes a second tile, where the second tile includes a first surface and a second surface. The tilewave material further includes a first attachment means, where the first attachment means attaches the first tile to the fiber, and a second attachment means, where the second attachment means attaches the second tile to the first fiber.

17 Claims, 7 Drawing Sheets

SYSTEMS AND METHODS FOR PRODUCING A TILEWAVE FABRIC

CROSS-REFERENCE TO RELATED APPLICATIONS

Not applicable.

BACKGROUND OF THE INVENTION

The use of textiles stretches far back into history. Many of the same fabrics and weavers used in today's textiles were first used hundreds or thousands of years ago. Nevertheless, new materials and new cuts mean that the fashion industry and the way people dress continues to change quickly and dramatically. Additionally textiles are used in our cars, on our floors, even on our walls. However, one constant remains; the material retains a single appearance once manufacturing is complete.

So called reversible material is often actually two materials sewn together, or a material in which the two sides differ in appearance from one another. However, when used in clothing, the material must be removed in order to change the appearance. Thus, no change of appearance can be affected in public. Additionally, the user can only select from one or two appearances without gradation between the two appearances possible.

One solution to this problem is the use of reversible sequins. The sequins are attached to the material and can be turned over to show a different face. The exposure of one face versus another can be used to change the overall appearance of the material and to create a new look. Nevertheless, reversible sequins suffer from a number of drawbacks.

The sequins are often held on inadequately. Sometimes, a single thread will be used to hold the sequin in place. Moderate force applied to the sequin can break the thread thus removing the sequin from the material. Repeated loss of sequins can lead to a degradation in the appearance of the material as gaps begin to show in the appearance. Further, repair of the sequins is difficult because the broken thread is part of the weave of the material, thus any repairs will not exactly match the original.

Additionally, the reversible sequins can tangle one another. The sequins either overlap one another or are far enough apart that they are independent of one another. If they overlap, the sequins can be forced into an unintended arrangement. Specifically, an edge that is intended to remain above an adjacent sequin can be forced under the adjacent sequin instead. This can lead to distortion of the image and prevent the sequins from being flipped over, thus ruining the appearance of the material.

If the sequins are far enough apart that they do not touch one another, then lateral force may force them into contact with one another. This can damage the sequins or cause them to stick, thus creating strain in the material that can lead to failures in the material. Additionally, stuck sequins may be prevented from flipping over and changing their appearance.

Reversible sequins require the user to be patient as they check to make sure that each sequin Is in showing the intended face. If the material is worn, then normal use can result in flipping of the sequins, resulting in a discontinuity in the appearance of the materials.

Finally, the sequins are limited in size and shape that can be used. The colors may be limited, thus preventing the material from truly taking on radically different appearances as desired. I.e., the appearance of the two sides of the sequins may be limited in how different from one another they can be because of limitations inherent in the use of sequins.

Accordingly, there is a need in the art for a material that can change appearance but that can be done without removing the material. Additionally, there is need in the art for a material that can withstand the rigors of everyday use without quickly failing. Further, there is a need in the art for a material that can change appearance in grades, according to the preferences of the user.

BRIEF SUMMARY OF SOME EXAMPLE EMBODIMENTS

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

One example embodiment includes a tilewave material. The tilewave material includes a fiber and a first tile, where the first tile includes a first surface and a second surface. The tilewave material also includes a second tile, where the second tile includes a first surface and a second surface. The tilewave material further includes a first attachment means, where the first attachment means attaches the first tile to the fiber, and a second attachment means, where the second attachment means attaches the second tile to the first fiber.

Another example embodiment includes a tilewave fabric forming a flexible material. The tilewave fabric includes a grid of fibers. The grid of fibers includes a first row of fibers and a second row of fibers, where the second row of fibers is in the same plane as the first row of fibers and parallel to the first row of fibers. The grid of fibers also includes a first column of fibers, where the first column of fibers is in the same plane as the first row of fibers and perpendicular to the first row of fibers, and a second column of fibers where the second column of fibers is in the same plane as the first row of fibers, perpendicular to the first row of fibers and parallel to the first column of fibers. The tilewave fabric also includes a first tile, where the first tile includes a first surface and a second surface, and a second tile, where the second tile includes a first surface and a second surface. The tilewave fabric further includes a first attachment means, where the first attachment means attaches a side of the first tile to the first column of fibers, and a second attachment means, where the second attachment means attaches a side of the second tile to the second column of fibers.

Another example embodiment includes a method of manufacturing a tilewave fabric forming a flexible material. The method includes providing a grid of fibers. The grid of fibers includes a first row of fibers and a second row of fibers, where the second row of fibers is in the same plane as the first row of fibers and parallel to the first row of fibers. The grid of fibers also includes a first column of fibers, where the first column of fibers is in the same plane as the first row of fibers and perpendicular to the first row of fibers, and a second column of fibers where the second column of fibers is in the same plane as the first row of fibers, perpendicular to the first row of fibers and parallel to the first column of fibers. The method also includes providing a first tile, where the first tile includes a first surface and a second surface, and providing a second tile, where the second tile includes a first surface and a second surface. The method further includes providing a first attachment means, where the first attachment means attaches a side of the first tile to the first column of fibers, and providing a second attachment means, where the second attachment means attaches a side of the second tile to the second column of fibers.

These and other objects and features of the present invention will become more fully apparent from the following description and appended claims, or may be learned by the practice of the invention as set forth hereinafter.

BRIEF DESCRIPTION OF THE DRAWINGS

To further clarify various aspects of some example embodiments of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION OF SOME EXAMPLE EMBODIMENTS

Reference will now be made to the figures wherein like structures will be provided with like reference designations. It is understood that the figures are diagrammatic and schematic representations of some embodiments of the invention, and are not limiting of the present invention, nor are they necessarily drawn to scale.

Figure 1:
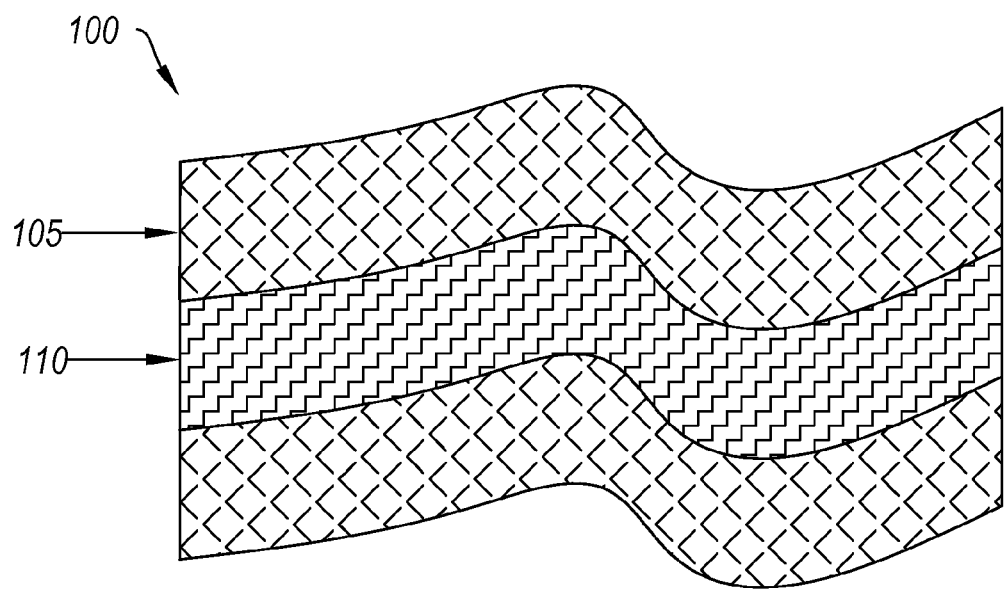
FIG. 1 illustrates an example of a tilewave fabric.

FIG. 1 illustrates an example of a tilewave fabric 100. In at least one implementation, the tilewave fabric 100 can change color or appearance based on the orientation of one or more tiles attached to the tilewave fabric 100. In particular, the tilewave fabric 100 can change color or appearance when the tilewave fabric 100 is rubbed, in response to electrical or chemical stimuli, at certain temperatures, or in response to any other stimuli which changes the orientation of the tiles, as discussed below.

As used herein, the term "fabric" includes any network of natural or artificial fibers including textiles and cloth. In at least one implementation, the fibers can include thread or yarn. For example, yarn can be produced by spinning raw wool fibers, linen, cotton, or other material on a spinning wheel to produce long strands. Fabrics can be formed by weaving, knitting, crocheting, knotting, or pressing fibers together, such as in felt. One of skill in the art will appreciate that a fabric can include a single fiber or more than one fibers.

FIG. 1 shows that the tilewave fabric 100 can include a first appearance 105 of the tilewave fabric 100. In particular, a first orientation of the tiles attached to the tilewave fabric 100 can include a first color or image; the first orientation will make a first surface of the tiles visible and, therefore, the included coloring or image visible. The accumulated colors or images displayed by the tiles will form the first appearance 105 of the tilewave fabric 100.

FIG. 1 also shows that the tilewave fabric 100 can include a second appearance 110 of the tilewave fabric 100. In particular, a second orientation of the tiles attached to the tilewave fabric 100 can include a second color or image; the second orientation can make a second surface of the tiles visible and, therefore, the included coloring or image of the second surface visible. The accumulated colors or images displayed by the tiles will form the second appearance 110 of the tilewave fabric 100.

One of skill in the art will appreciate that the tilewave fabric 100 need not be capable of producing only a first appearance 105 and a second appearance 110. Indeed, individual tiles can change orientation in multiple combinations, and thus expose different surfaces, as desired to produce nearly numberless sets of appearances as desired by the user. Additionally or alternatively, the tiles can be positioned in more than two orientations. For example, orienting the tiles to the left could expose a first surface of the tile, orienting the tiles to the right could expose a second surface, orienting the tiles upward could expose a third surface and orienting the tiles downward could expose a fourth surface.

Figure 2:
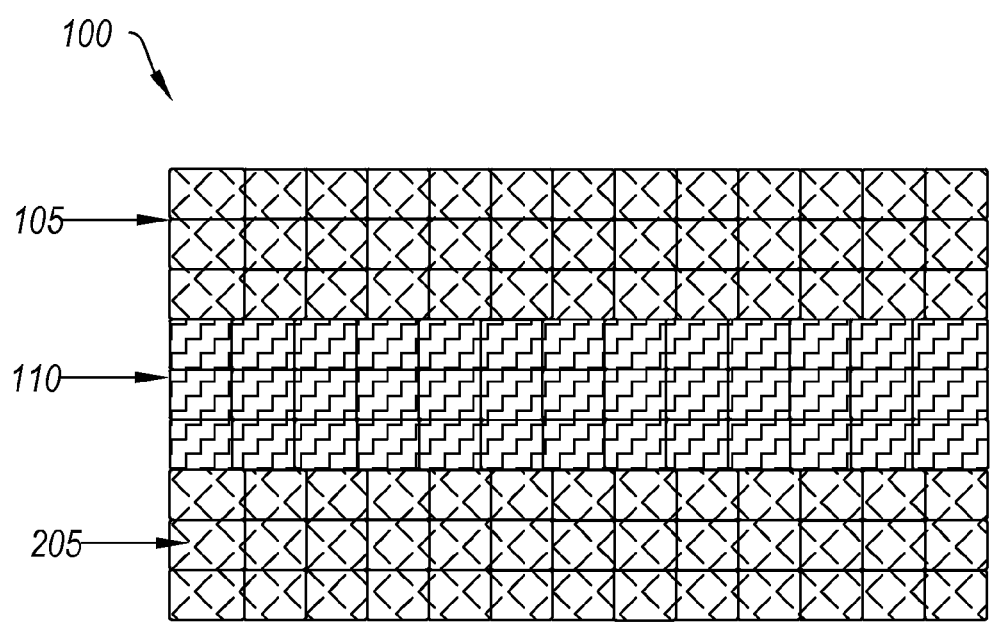
FIG. 2 illustrates the tilewave fabric of FIG. 1 with one or more tiles for changing the appearance of the tilewave fabric.

FIG. 2 illustrates the tilewave fabric 100 of FIG. 1 with one or more tiles 205 for changing the appearance of the tilewave fabric 100. In at least one implementation, the tiles 205 are configured to lie flat, or substantially flat, on the tilewave fabric 100, as described below. In at least one implementation, the one or more tiles 205 oriented to the right gives the tilewave fabric 100 a first appearance 105. Alternatively, the one or more tiles 205 oriented to the left gives the tilewave fabric 100 a second appearance 110.

One of skill in the art will appreciate that a single tile 205 can change orientation without changing the orientation of the surrounding tiles 205, as discussed below. Thus, the user can orient the one or more tiles 205 in a number of different configures, producing nearly limitless possible appearances.

Figure 3A:
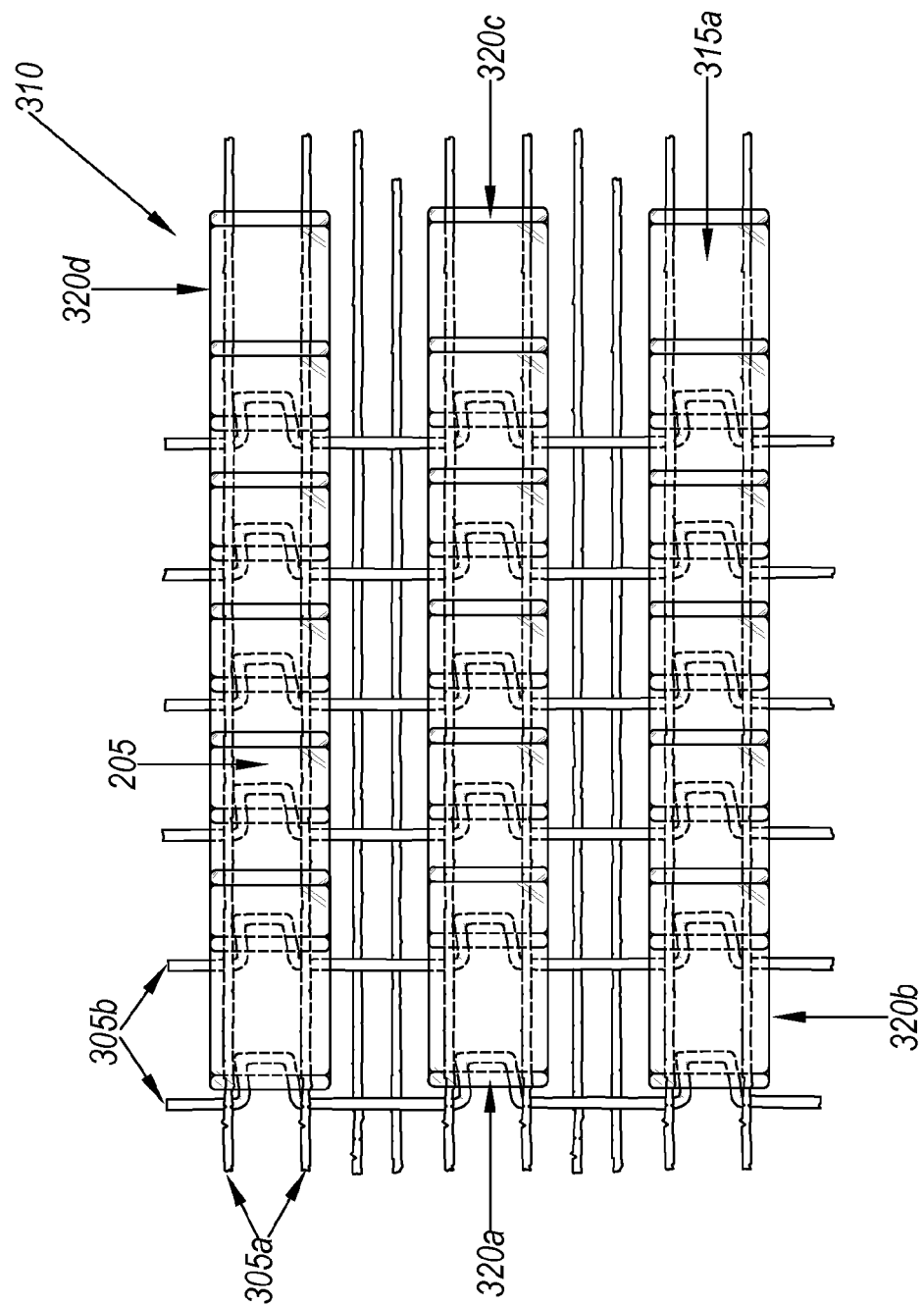
FIG. 3A illustrates a front view of the tilewave fabric.
Figure 3B:
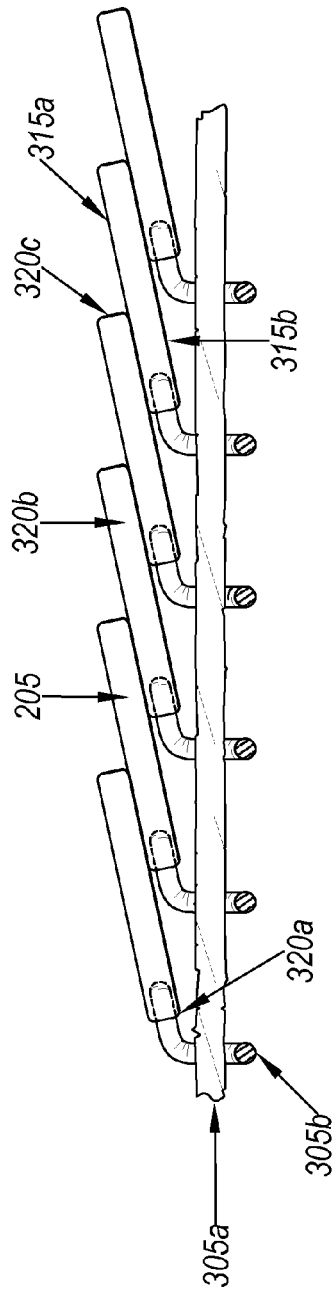
FIG. 3B illustrates a side view of the tilewave fabric.
Figure 3C:
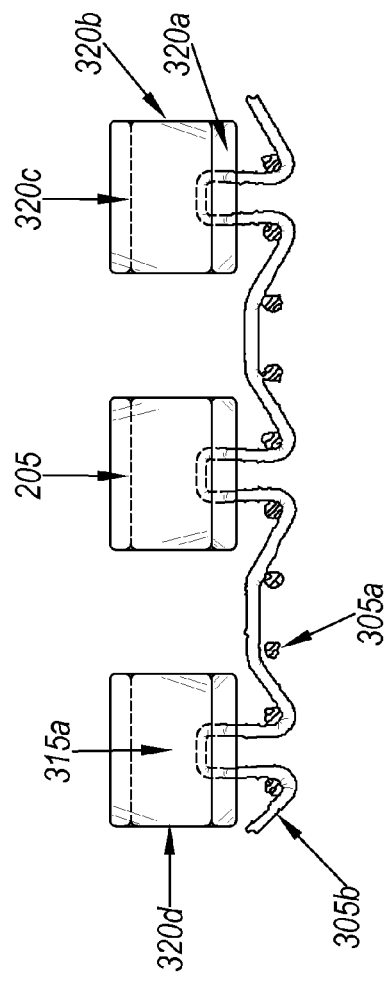
FIG. 3C illustrates an alternative side view of the tilewave fabric.
Figure 3D:
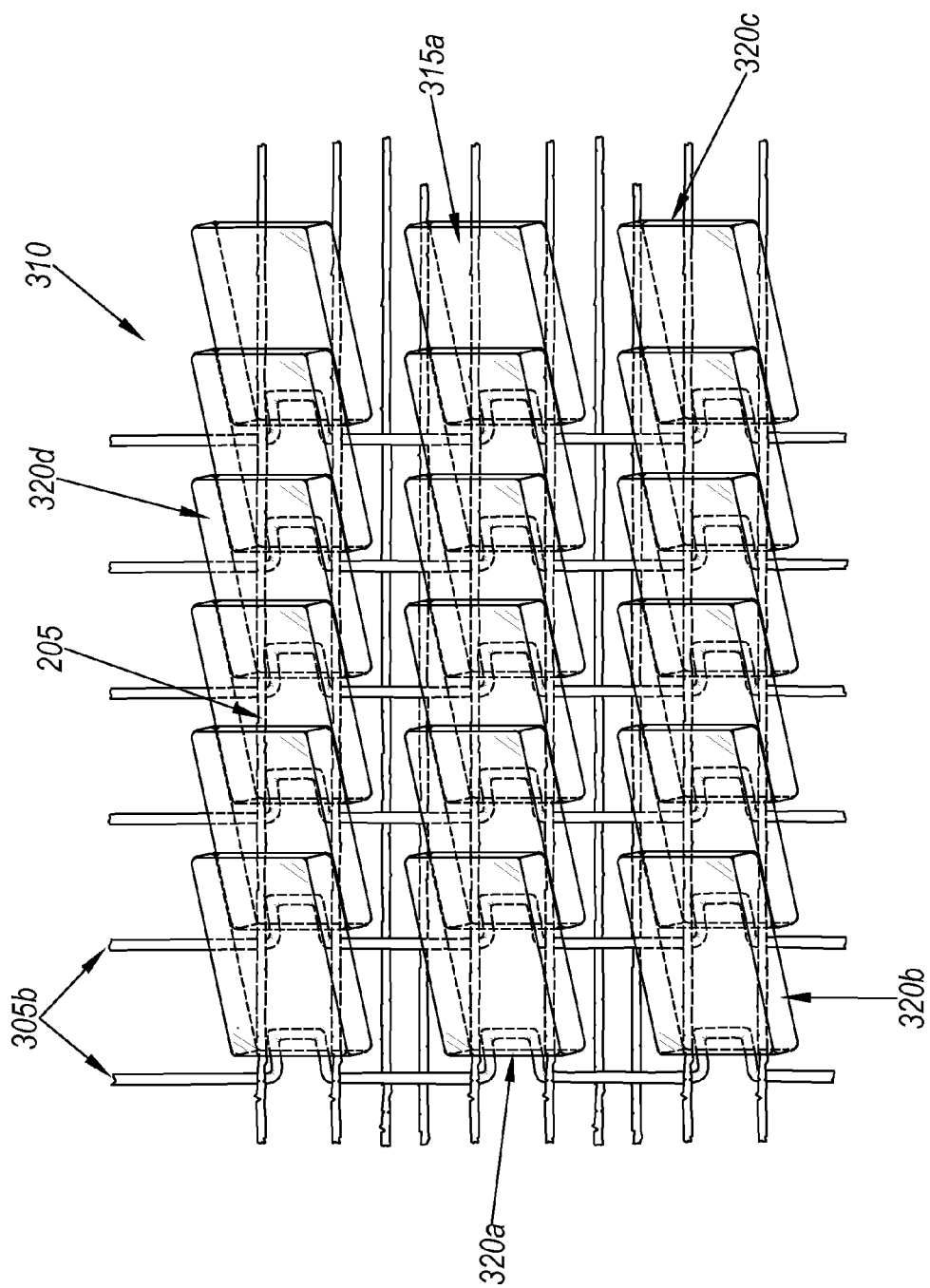
FIG. 3D illustrates a perspective view of the tilewave fabric.

FIGS. 3A-3D illustrate expanded views of a tilewave fabric 100. FIG. 3A illustrates a front view of the tilewave fabric 100. FIG. 3B illustrates a side view of the tilewave fabric 100. FIG. 3C illustrates an alternative side view of the tilewave fabric 100. FIG. 3D illustrates a perspective view of the tilewave fabric 100. One of skill in the art will also appreciate that the tilewave fabric 100 is only one example of tilewave fabric and should not be seen as limiting of the invention.

FIGS. 3A-3D show that the tilewave fabric includes fibers 305a and 305b (collectively "fibers 305). In at least one implementation, fibers 305, also spelled fibres, is a class of materials that are continuous filaments or are in discrete elongated pieces. In particular, fibers 305 can be spun into filaments, string or rope, used as a component of composite materials, or matted into sheets to make products such as paper or felt. Additionally or alternatively, fibers 305 can include yarn, thread, string, filaments, twine, cord, or any other material that can be used to form a fabric or cloth. In particular, yarn is a long continuous length of interlocked fibers, suitable for use in the production of textiles, sewing, crocheting, knitting, weaving, embroidery and rope making. Additionally or alternatively, thread is a type of yarn intended for sewing by hand or machine. Yarn and/or thread may be finished with wax or other lubricants to withstand the stresses involved in sewing or otherwise manufacturing the tilewave fabric 100.

Natural fibers can include animal fibers such as alpaca, angora, bison down, camel hair, cashmere, catgut, chiengora, guanaco, llama, mohair, pashmina, qiviut, rabbit, silk, sinew, spider silk, wool, vicuña, and yak; vegetable fibers such as aback bamboo, coir, cotton, flax, hemp, jute, kapok, kenaf, piña, raffia palm, ramie, sisal, and wood; mineral fibers such as asbestos, basalt, mineral wool, and glass wool; and cellulose fibers such as acetate, art silk, bamboo, lyocell (tencel), modal, and rayon; or any other natural fiber. Synthetic fibers can include acrylic, aramid (twaron, kevlar, technora, and nomex), carbon (tenax), derclon, microfiber, modacrylic, nylon, olefin, polyester, polyethylene (dyneema, spectra), spandex, vinalon, zylon, or any other synthetic fiber. One of skill in the art will appreciate that fibers 305 can include any natural or synthetic fibers, or any combination thereof, without restriction and without limitation unless otherwise indicated in the claims.

FIGS. 3A-3D show that the fibers 305 can be used to form a grid 310. In particular, the fibers 305a can be oriented in a "horizontal" direction; that is, the fibers 305a can be oriented parallel to one another. One of skill in the art will appreciate that horizontal orientation refers to the orientation shown in FIGS. 3A-3D and is not used to limit or restrict the scope of the claims unless otherwise indicated in the claims. Further, the fibers 305a can be spaced equidistant from one another or in a repeating pattern. For example, a first fiber 305a might be relatively close to a second fiber 305a, which is, in turn, relatively farther from a third fiber 305a, with the pattern repeating throughout the tilewave fabric 100. One of skill in the art will appreciate that the spacing of the fibers 305a can be any distance from one another without restriction and without limitation unless otherwise indicated in the claims.

FIGS. 3A-3D further shows that the fibers 305b can be oriented in a "vertical" direction; that is, the fibers 305b can be oriented parallel to one another. One of skill in the art will appreciate that vertical orientation refers to the orientation shown in FIGS. 3A-3D and is not used to limit or restrict the scope of the claims unless otherwise indicated in the claims. Further, the fibers 305b can be spaced equidistant from one another or in a repeating pattern. For example, a first fiber 305b might be relatively close to a second fiber 305b, which is, in turn, relatively farther from a third fiber 305b, with the pattern repeating throughout the tilewave fabric 100. One of skill in the art will appreciate that the spacing of the fibers 305b can be any distance from one another without restriction and without limitation unless otherwise indicated in the claims.

In at least one implementation, the fibers 305 can be woven together. In particular, weaving is the textile art in which a first set of fibers 305a and a second set of fibers 305b, called the warp and the filling or weft (older woof), respectively, are interlaced with each other to form a fabric or cloth. In particular, the fibers 305a can be held in place while the fibers 305b are woven through them or vice versa. The manner in which the fibers 305a and the fibers 305b interlace with each other is known as the weave. In particular, the weave can include plain weave, satin weave, and twill or any other type of weave.

In at least one implementation, plain weave can include the fibers 305a and fibers 305b aligned so they form a simple criss-cross pattern. Each fiber 305b crosses the fibers 305a by going over one, then under the next, and so on. The next fiber 305b goes under the fibers 305a that its neighbor went over, and vice versa. The satin weave is characterized by four or more fibers 305b floating over a fiber 305a or vice versa, four or more fibers 305a floating over a single fiber 305b. Twill is a type of fabric woven with a pattern of diagonal parallel ribs.

It is made by passing the fibers 305b over one or more fibers 305a and then under two or more fibers 305a and so on, with a "step" or offset between rows to create the characteristic diagonal pattern.

FIGS. 3A-3D also show that the tilewave fabric 100 can include one or more tiles 205. In at least one implementation the tiles 205 can include plastic, wood, metal, cloth, ceramic or any other suitable material. In particular, the tiles 205 can be made of any material that allows them to perform their intended functions, as described below. Additionally or alternatively, the tiles 205 can include more than one material. That is, the tile 205 can be a composite material or can include a first material connected to a second material. One of skill in the art will appreciate that the tile can include any material without limitation and without restriction unless otherwise specified in the claims.

In at least one implementation, the tiles 205 are rectangular cuboids. In particular, tiles 205 which are rectangular cuboids can include six faces, with all angles forming right angles. Thus, each tile 205 will include a first surface 315a and a second surface 315b parallel to one another. The first surface 315a and second surface 315b can be rectangular in shape and share dimensions. That is, the first surface 315a and the second surface 315b can be the same size as one another. Further, each tile 205 will include four sides 320a, 320b, 320c and 320d, which are also rectangular in shape.

Additionally or alternatively, the tiles 205 can include one or more rounded corners and/or faces. For example, one side of the first surface can be changed to an arc shape, such that the first surface forms a closed "U" shape. One of skill in the art will appreciate that the tiles 205 can include any shape that allows the tiles 205 to perform their functions, as described below, unless otherwise specified in the claims. One of skill in the art will further appreciate that the tiles 205 can differ in shape unless otherwise specified in the claims. That is, one tile 205 could be one shape while adjacent tiles 205 are a second shape.

In at least one implementation, a portion of the second surface 315b of a first tile 205 is in contact with a portion of the first surface 315a of a second tile 205. In particular, the tiles 205 can be oriented such that either the first surface 315a or the second surface 315b of the tiles 205 can be in proximity to the fibers 305. That is, the tiles 205 can be capable or rotating about one or more of the fibers 305 such that either the first surface 315a or the second surface 315b can be in proximity to the fibers 305 while the opposing surface is oriented away from the fibers 305.

In at least one implementation, the first surface 315a can include a first color and the second surface 315b can include a second color. Additionally or alternatively, the first surface 315a can include a first image and the second surface 315b can include a second image. For example, the first surface 315a can include a portion of a first image, such that when the tiles 205 are oriented with the first surface 315a away from the fibers 305, the portions of the first image, can combine to form the first image. In addition, the second surface 315b can include a portion of a second image, such that when the tiles 205 are oriented with the second surface 315b away from the fibers 305, the portions of the second image can combine to form the second image.

Figure 4:
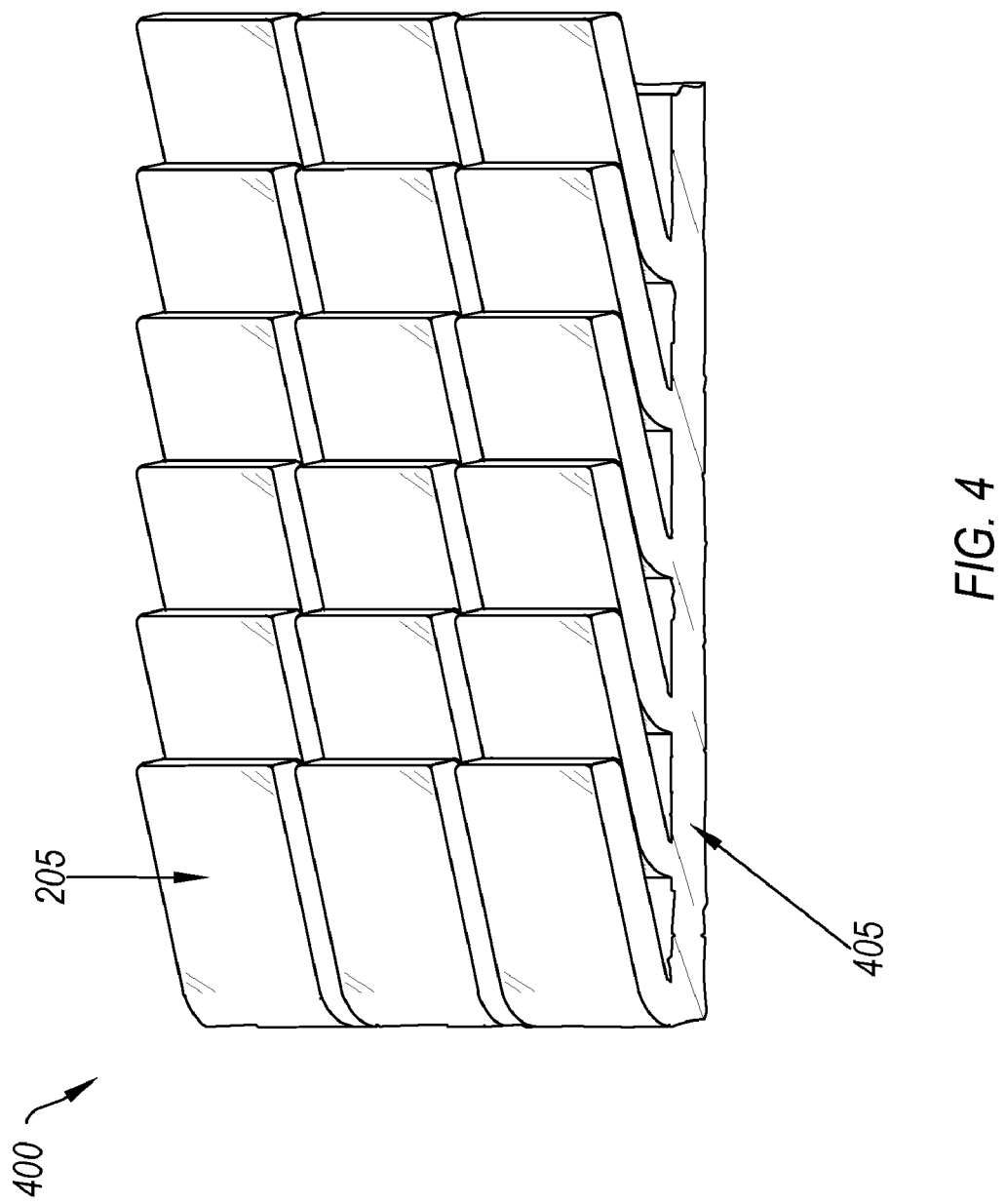
FIG. 4 illustrates an example of an injection molded tilewave material.

FIG. 4 illustrates an example of an injection molded tilewave material 400. In at least one implementation, injection molding is a manufacturing process for producing parts from thermoplastic, thermosetting plastic and other materials that can be manipulated while in liquid form. Material is fed into a heated barrel, mixed, and forced into a mold cavity where it cools and hardens to the configuration of the mold cavity.

FIG. 4 shows that the injection molded tilewave material 400 can include a base layer 405. In at least one implementation, the base layer 405 can include a fabric or cloth. Additionally or alternatively, the base layer 405 can include other decorative or functional materials, such as leather, paper, wood, or any other natural or synthetic fiber. One of skill in the art will appreciate that virtually any material can be used as the base layer 405.

FIG. 4 also shows that the injection molded tilewave material 400 can include a tile 205. In at least one implementation the tile can include plastic, wood, metal, cloth, ceramic or any other suitable material. In particular, the tile can be made of any material that allows the tile to perform its intended functions. Additionally or alternatively, the first tile can include more than one material. That is, the first tile can be a composite material or can include a first material connected to a second material. One of skill in the art will appreciate that the tile can include any material without limitation and without restriction unless otherwise specified in the claims.

Figure 5A:
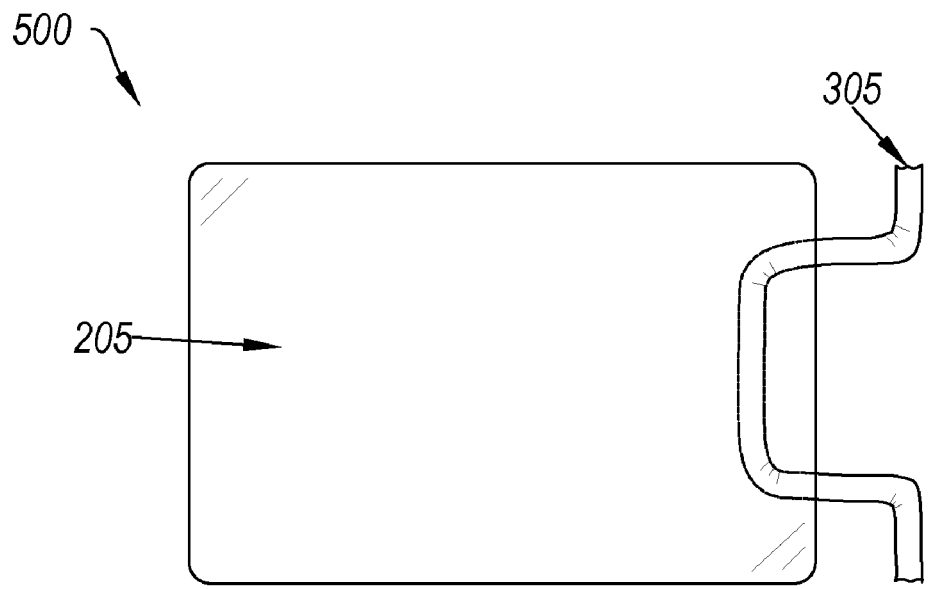
FIG. 5A illustrates an attachment between a tile and a fiber.
Figure 5B:
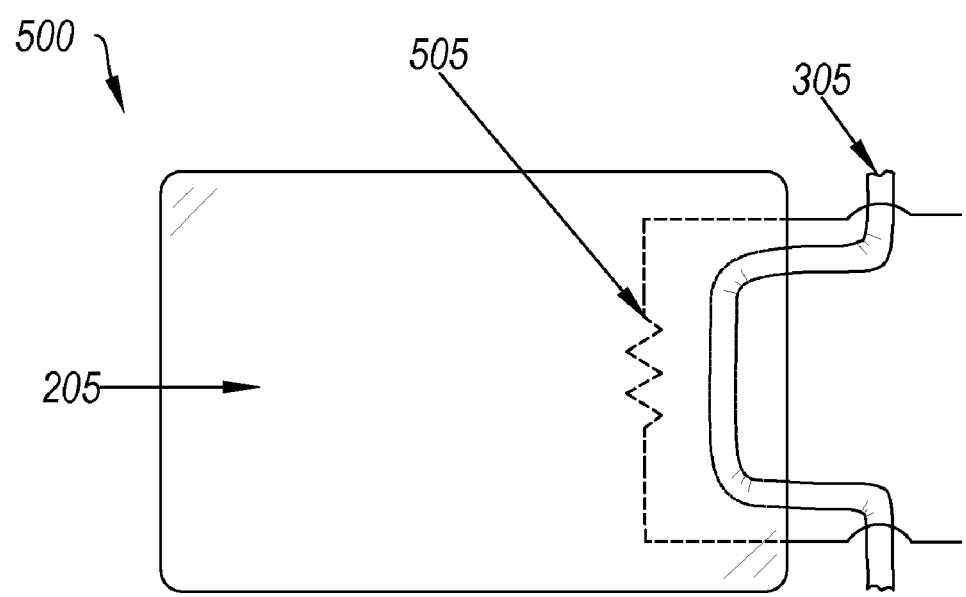
FIG. 5B illustrates an attachment which includes a conductive ribbon.

FIGS. 5A and 5B illustrate a close up view of an attachment 500 between a tile 205 and a fiber 305. FIG. 5A illustrates an attachment 500 between a tile 205 and a fiber 305. FIG. 5B illustrates an attachment 500 which includes a conductive ribbon 505. The attachment 500 can occur in a tilewave fabric, such as the tilewave fabric 100 of FIG. 1; however, one of skill in the art will appreciate that the attachment can occur between any tile 205 and a fiber 305. One of skill in the art will also appreciate that the attachment 500 is only one example of an attachment between a tile 205 and a fiber 305 and should not be seen as limiting of the invention unless otherwise specified in the claims.

FIGS. 5A and 5B shows that the attachment 500 can include a flat stitch. In at least one implementation, a flat stitch is any stitch that allows the fiber 305 to hold the tile 205 such that the tile 205 lies flat, or substantially flat, against the fibers 305. That is, the flat stitch can pull the tile 205 such that the first surface 315$a$ or second surface 315$b$ of the tile 205 lies either on the fibers 305 or on adjacent tiles. A tile 205 which is moved by some external force such that the tile 205 is no longer in contact with the fibers 305 or adjacent tiles 205 will be pulled back into contact with the fibers 305 or adjacent tiles 205 when the external force is removed.

In at least one implementation, the attachment 500 can allow the tile 205 to rotate relative to one or more fibers 305. In particular the attachment 500 can allow the tile 205 to rotate relative to the fiber 305 to which the tile is attached. That is, the attachment 500 can allow the tile to be oriented such that either the first surface 315$a$ or the second surface 315$b$ of the tile 205 is oriented away from the fibers 305. In either orientation, the attachment 500 can hold the tile 205 such that the tile 205 lies flat, or substantially flat, on the fibers 305 or on adjacent tiles 205.

In at least one implementation, the attachment 500 can pass through the tile 205. That is, the tile 205 can include one or more holes through which the attachment 500 can pass in order to secure the tile 205 to the fibers 305. Additionally or alternatively, the attachment 500 can circumscribe the tile 305, such that the attachment 500 secures four faces of the tile 205. Additionally or alternatively, the tiles 205 can include one or more notches to prevent the attachment 500 from moving relative to the tile 205.

Additionally or alternatively, the tile 205 can be injection molded onto the attachment 500. Injection molding is a manufacturing process for producing parts from thermoplastic, thermosetting plastic and other materials that can be manipulated while in liquid form. Material is fed into a heated barrel, mixed, and forced into a mold cavity where it cools and hardens to the configuration of the mold cavity. In particular, the tile 205 can be formed around the attachment 500.

FIG. 5B shows that the attachment 500 can include a conductive ribbon 505. In at least one implementation, the conductive ribbon 505 can allow rotation of the tile 205 relative to the fiber 305 in response to electrical stimulation. Electrical stimulation can occur as a result of changes to a user interface or in response to some external electrical signal. For example, the conductive ribbon 505 could convert sunlight to electrical energy or otherwise produce electrical stimuli in response to the light that changes the orientation of the tile 205 relative to the fiber 305.

Figure 6:
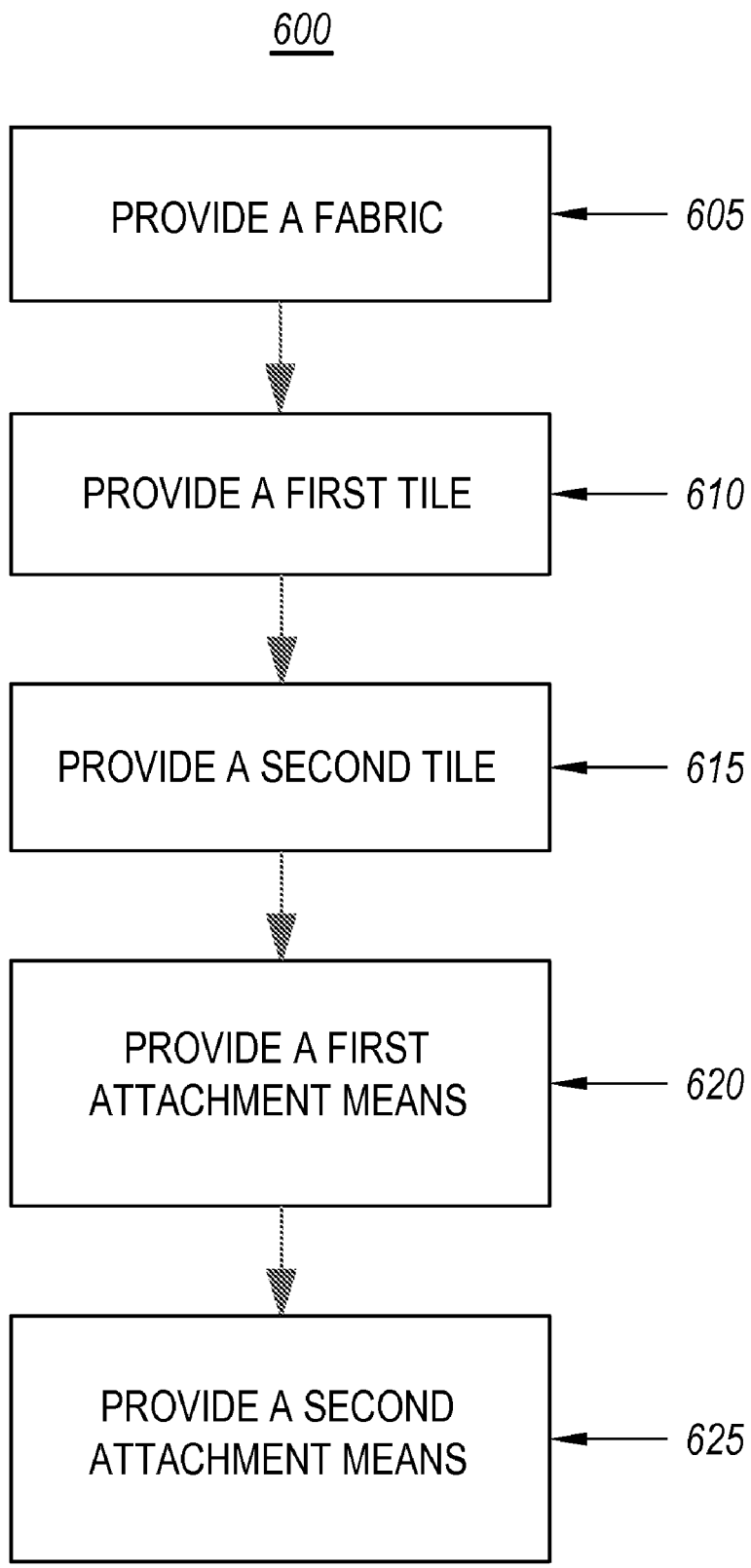
FIG. 6 is a flow chart illustrating a method for manufacturing a tilewave fabric.

Additionally or alternatively, the conductive ribbon 505 can produce changes in the magnetism of the tile 205. For example, in response to electrical stimulation, the second surface 315$b$, or a portion thereof, of the tile 205 can change magnetic polarization such that the second surface 315$b$ is repelled from the first surface 315$a$ of an adjacent tile 205. One of skill in the art will appreciate that any mechanism for changing the orientation of the tile 205 in relation to the fiber 305 is contemplated within the scope of the invention FIG. 6 is a flow chart illustrating a method 600 for manufacturing a tilewave fabric. In at least one implementation, the method 600 can be used to manufacture the tilewave fabric 100 of FIG. 1; however, one of skill in the art will appreciate that the method 600 can be used to manufacture any tilewave fabric. One of skill in the art will also appreciate that the method 600 is only one example of a method that can be used to manufacture a tilewave fabric and should not be seen as limiting of the invention unless otherwise specified in the claims.

FIG. 6 shows that the method 600 includes providing 605 a fabric. In at least one implementation, the fabric includes a grid of fibers including horizontal rows of fibers and vertical columns of fibers. In at least one implementation, the fibers can be woven together. In particular, weaving is the textile art in which a first set of fibers and a second set of fibers, called the warp and the filling or weft, respectively, are interlaced with each other to form a fabric or cloth. In particular, the fibers can be held in place while the fibers are woven through them or vice versa. The manner in which the warp and filling threads interlace with each other is known as the weave. In particular, the weave can include plain weave, satin weave, and twill or any other type of weave.

FIG. 6 also shows that the method can include providing 610 a first tile. In at least one implementation the first tile can include plastic, wood, metal, cloth, ceramic or any other suitable material. In particular, the first tile can be made of any material that allows the first tile to perform its intended functions. Additionally or alternatively, the first tile can include more than one material. That is, the first tile can be a composite material or can include a first material connected to a second material. One of skill in the art will appreciate that the first tile can include any material without limitation and without restriction unless otherwise specified in the claims.

In at least one implementation, the first tile is a rectangular cuboid. In particular, the first tile can include six faces, with all angles forming right angles. Thus, each first tile will include a first surface and a second surface parallel to one another. The first surface and second surface can be rectangular in shape and share dimensions. That is, the first surface and the second surface can be the same size as one another. Further, each first tile will include four sides which are also rectangular in shape.

FIG. 6 also shows that the method 600 can include providing 615 a second tile. In at least one implementation, the second tile can be the same shape and size as the first tile.

Additionally or alternatively, the second tile can be of a different size or shape with respect to the first tile. One of skill in the art will appreciate that whether or not the second tile is the same size and shape as the first tile is not limiting of the invention unless otherwise specified in the claims.

FIG. 6 further shows that the method 600 can include providing 620 a first attachment means. In a least one implementation, the first attaching means attaches a side of the first tile to a first vertical column. In at least one implementation, the attaching means includes a flat stitch. In particular, a flat stitch is any stitch that allows the fiber to hold the tile such that the tile lies flat, or substantially flat, against the fibers. That is, the flat stitch can pull the tile such that the first surface or second surface of the tile lies either on the fibers or on adjacent tiles. A tile which is moved by some external force such that the tile is no longer in contact with the fibers or adjacent tiles will be pulled back into contact with the fibers or adjacent tiles when the external force is removed.

In at least one implementation, the attachment means can include injection molding. In particular, injection molding can include a manufacturing process for producing parts from thermoplastic, thermosetting plastic and other materials that can be manipulated while in liquid form. Material is fed into a heated barrel, mixed, and forced into a mold cavity where it cools and hardens to the configuration of the mold cavity. In particular, the tile can be formed around the fiber.

In at least one implementation, the attachment can allow the tile to rotate relative to one or more fibers. In particular the attachment can allow the tile to rotate relative to the fiber to which the tile is attached. That is, the attachment can allow the tile to be oriented such that either the first surface or the second surface of the tile is oriented away from the fibers. In either orientation, the attachment can hold the tile such that the tile lies flat, or substantially flat, on the fibers or on adjacent tiles.

FIG. 6 further shows that the method 600 can include providing 625 a second attachment means. In at least one implementation, the second attaching means attaches a side of the second tile to a second vertical column, where the second vertical column is adjacent to the first vertical column. In particular, the first vertical column and the second vertical column can be close enough to one another that a portion of the first surface of the first tile can be in contact with a portion of the second surface of the second tile.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A tilewave fabric forming a flexible material, wherein the tilewave fabric comprising:
a grid of fibers, wherein the grid of fibers includes:
a first row of fibers;
a second row of fibers, wherein the second row of fibers is in the same plane as the first row of fibers and parallel to the first row of fibers;
a first column of fibers, wherein the first column of fibers is in the same plane as the first row of fibers and perpendicular to the first row of fibers; and
a second column of fibers wherein the second column of fibers is in the same plane as the first row of fibers, perpendicular to the first row of fibers and parallel to the first column of fibers;
a first tile, wherein the first tile includes a first surface and a second surface;
a second tile, wherein the second tile includes a first surface and a second surface;
a first attachment means, wherein the first attachment means:
attaches a side of the first tile to the first column of fibers; and
allows rotation of the first tile with respect to the first column of fibers; and
a second attachment means, wherein the second attachment means attaches a side of the second tile to the second column of fibers.

2. The tilewave fabric according to claim 1, wherein a portion of the first surface of the first tile is in contact with a portion of the second surface of the second tile.

3. The tilewave fabric according to claim 1, wherein the second attachment means allows rotation of the first tile with respect to the first column of fibers.

4. The tilewave fabric according to claim 1, further comprising:
a third column of fibers wherein:
the third column of fibers is in the same plane as the first column of fibers;
the third column of fibers is parallel to the first column of fibers and the second column of fibers; and
the second column of fibers is in between the first column of fibers and the third column of fibers;
a third tile, wherein the third tile includes a first surface and a second surface; and
a third attachment means, wherein the third attachment means attaches the third tile to the third column of fibers.

5. The tilewave fabric according to claim 4, wherein:
a portion of the first surface of the first tile is in contact with a portion of the second surface of the second tile; and
a portion of the first surface of the second tile is in contact with a portion of the second surface of the third tile.

6. The tilewave fabric according to claim 5, wherein:
the first surface of the first tile is oriented away from the grid of fibers;
the first surface of the second tile is oriented away from the grid of fibers; and
the first surface of the third tile is oriented away from the grid of fibers.

7. The tilewave fabric according to claim 5, wherein:
the second surface of the first tile is oriented away from the grid of fibers;
the second surface of the second tile is oriented away from the grid of fibers; and
the second surface of the third tile is oriented away from the grid of fibers.

8. The tilewave fabric according to claim 4, wherein:
the second attachment means is configured to allow rotation of the second tile with respect to the second column of fibers; and
the third attachment means is configured to allow rotation of the third tile with respect to the third column of fibers.

9. The tilewave fabric according to claim 1, wherein the tilewave fabric further includes:
- a third tile, wherein the third tile includes a first surface and a second surface; and
- a fourth tile, wherein the fourth tile includes a first surface and a second surface;
- a third attachment means, wherein the third attachment means attaches the third tile to the first column of fibers; and
- a fourth attachment means, wherein the fourth attachment means attaches the fourth tile to the second column of fibers.

10. The tilewave fabric according to claim 9, wherein:
- a portion of the first surface of the first tile is in contact with a portion of the second surface of the second tile; and
- a portion of the first surface of the third tile is in contact with a portion of the second surface of the fourth tile.

11. The tilewave fabric according to claim 1, wherein:
- the first attachment means includes a first flat stitch, wherein the first flat stitch is configured to retain the first surface and second surface of the first tile substantially parallel to plane formed by the first row of fibers and the second row of fibers; and
- the second attachment means includes a second flat stitch, wherein the second flat stitch is configured to:
  - retain the first surface and second surface of the second tile substantially parallel to plane formed by the first for of fibers and the second row of fibers; and
  - maintain contact between the first surface of the first tile and the second surface of the second tile.

12. The tilewave fabric according to claim 11, wherein:
- the first surface of the first tile is in proximity to the grid of fibers; and
- the first surface of the second tile is in proximity to the grid of fibers.

13. The tilewave fabric according to claim 11, wherein:
- the second surface of the first tile is in proximity to the grid of fibers; and
- the second surface of the second tile is in proximity to the grid of fibers.

14. A method of manufacturing tilewave fabric forming a flexible material, the method comprising:
- providing a grid of fibers, wherein the grid of fibers includes:
  - a first row of fibers;
  - a second row of fibers, wherein the second row of fibers is in the same plane as the first row of fibers and parallel to the first row of fibers;
  - a first column of fibers, wherein the first column of fibers is in the same plane as the first row of fibers and perpendicular to the first row of fibers; and
  - a second column of fibers wherein the second column of fibers is in the same plane as the first row of fibers, perpendicular to the first row of fibers and parallel to the first column of fibers;
- providing a first tile, wherein the first tile includes a first surface and a second surface;
- providing a second tile, wherein the second tile includes a first surface and a second surface;
- providing a first attachment means, wherein the first attachment means:
  - attaches a side of the first tile to the first column of fibers; and
  - allows rotation of the first tile with respect to the first column of fibers; and
- providing a second attachment means, wherein the second attachment means attaches a side of the second tile to the second column of fibers.

15. The method according to claim 14, wherein the method further comprises:
- providing a first color on the first surface of the first tile; and
- providing a second color on the second surface of the first tile.

16. The method according to claim 15, wherein the method further comprises:
- providing the first color on the first surface of the second tile; and
- providing the second color on the second surface of the second tile.

17. The method according to claim 14, wherein the method further comprises:
- providing a first image on the first surface of the first tile; and
- providing a second image on the second surface of the first tile.

* * * * *